United States Patent
Xu et al.

(10) Patent No.: US 9,756,667 B2
(45) Date of Patent: Sep. 5, 2017

(54) METHOD AND APPARATUS FOR PERFORMING X2 SETUP PROCEDURE IN WIRELESS COMMUNICATION SYSTEM

(71) Applicant: LG ELECTRONICS INC., Seoul (KR)

(72) Inventors: Jian Xu, Seoul (KR); Daewook Byun, Seoul (KR); Insun Lee, Seoul (KR); Kyungmin Park, Seoul (KR)

(73) Assignee: LG Electronics Inc., Seoul (KR)

( * ) Notice: Subject to any disclaimer, the term of this patent is extended or adjusted under 35 U.S.C. 154(b) by 81 days.

(21) Appl. No.: 14/766,583

(22) PCT Filed: Feb. 18, 2014

(86) PCT No.: PCT/KR2014/001291
§ 371 (c)(1),
(2) Date: Aug. 7, 2015

(87) PCT Pub. No.: WO2014/126441
PCT Pub. Date: Aug. 21, 2014

(65) Prior Publication Data
US 2015/0373755 A1    Dec. 24, 2015

Related U.S. Application Data

(60) Provisional application No. 61/765,812, filed on Feb. 18, 2013.

(51) Int. Cl.
*H04W 4/20*    (2009.01)
*H04L 12/24*    (2006.01)
(Continued)

(52) U.S. Cl.
CPC ....... *H04W 76/02* (2013.01); *H04W 72/0406* (2013.01); *H04W 80/06* (2013.01);
(Continued)

(58) Field of Classification Search
None
See application file for complete search history.

(56) References Cited

U.S. PATENT DOCUMENTS

| 2011/0243097 A1* | 10/2011 | Lindqvist | H04W 24/02 370/331 |
| 2011/0274030 A1* | 11/2011 | Wang | H04W 76/02 370/315 |

(Continued)

FOREIGN PATENT DOCUMENTS

| WO | 2011-139112 A2 | 11/2011 |
| WO | 2012-093893 A2 | 7/2012 |
| WO | 2012-148217 A2 | 11/2012 |

*Primary Examiner* — Edan Orgad
*Assistant Examiner* — Sithu Ko
(74) *Attorney, Agent, or Firm* — Dentons US LLP

(57) ABSTRACT

A method and apparatus for performing an X2 setup procedure in a wireless communication system is provided. An X2 gateway (GW) establishes a stream control transmission protocol (SCTP) connection with an eNodeB (eNB) based on a transport network layer (TNL) address of the X2-GW, receives an X2 setup request message from the eNB, and transmits an indication which indicates an invalidity of served cell information IE to the eNB.

5 Claims, 10 Drawing Sheets

(51) Int. Cl.
*H04W 76/02* (2009.01)
*H04W 80/06* (2009.01)
*H04W 72/04* (2009.01)
H04W 92/04 (2009.01)
H04W 84/04 (2009.01)
H04W 88/16 (2009.01)

(52) U.S. Cl.
CPC .......... *H04W 84/045* (2013.01); *H04W 88/16* (2013.01); *H04W 92/04* (2013.01)

(56) References Cited

U.S. PATENT DOCUMENTS

| | | | |
|---|---|---|---|
| 2011/0310791 A1* | 12/2011 | Prakash | H04W 24/02 370/315 |
| 2012/0100860 A1 | 4/2012 | Lei et al. | |
| 2012/0106488 A1 | 5/2012 | Nylander et al. | |
| 2012/0190368 A1* | 7/2012 | Zhang | H04W 36/0055 455/436 |
| 2013/0150021 A1* | 6/2013 | Oh | H04W 88/16 455/422.1 |
| 2015/0016306 A1* | 1/2015 | Masini | H04L 41/0809 370/255 |
| 2015/0109999 A1* | 4/2015 | Godin | H04W 92/20 370/328 |

* cited by examiner

FIG. 3
(Prior Art)
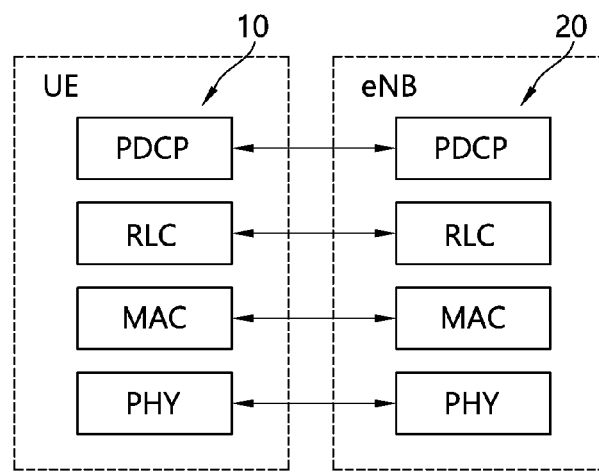
(a)
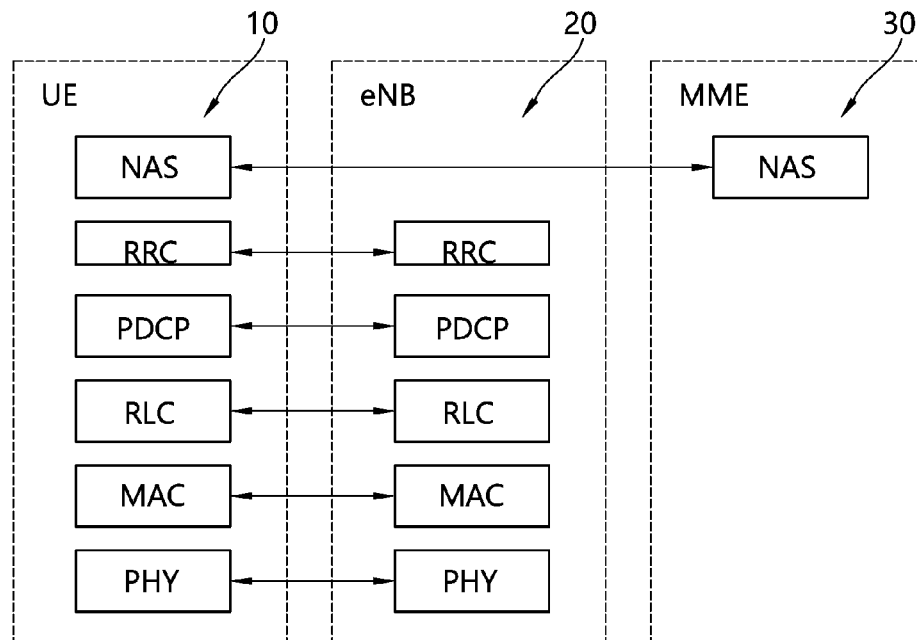
(b)

METHOD AND APPARATUS FOR PERFORMING X2 SETUP PROCEDURE IN WIRELESS COMMUNICATION SYSTEM

This application is a 35 U.S.C. §371 National Stage entry of International Application No. PCT/KR2014/001291 filed on Feb. 18, 2014, and claims priority to U.S. Provisional Application No. 61/765,812 filed on Feb. 18, 2013, both of which are hereby incorporated by reference in their entireties as if fully set forth herein.

BACKGROUND OF THE INVENTION

Field of the Invention

The present invention relates to wireless communications, and more particularly, to a method and apparatus for performing an X2 setup procedure in a wireless communication system.

Related Art

Universal mobile telecommunications system (UMTS) is a 3rd generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), a base transceiver system (BTS), an access point, etc. One eNB 20 may be deployed per cell. There are one or more cells within the coverage of the eNB 20. A single cell is configured to have one of bandwidths selected from 1.25, 2.5, 5, 10, and 20 MHz, etc., and provides downlink or uplink transmission services to several UEs. In this case, different cells can be configured to provide different bandwidths.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) which is in charge of control plane functions, and a system architecture evolution (SAE) gateway (S-GW) which is in charge of user plane functions. The MME/S-GW 30 may be positioned at the end of the network and connected to an external network. The MME has UE access information or UE capability information, and such information may be primarily used in UE mobility management. The S-GW is a gateway of which an endpoint is an E-UTRAN. The MME/S-GW 30 provides an end point of a session and mobility management function for the UE 10. The EPC may further include a packet data network (PDN) gateway (PDN-GW). The PDN-GW is a gateway of which an endpoint is a PDN.

The MME provides various functions including non-access stratum (NAS) signaling to eNBs 20, NAS signaling security, access stratum (AS) security control, Inter core network (CN) node signaling for mobility between 3GPP access networks, idle mode UE reachability (including control and execution of paging retransmission), tracking area list management (for UE in idle and active mode), P-GW and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on APN-AMBR. For clarity MME/S-GW 30 will be referred to herein simply as a "gateway," but it is understood that this entity includes both the MME and S-GW.

Interfaces for transmitting user traffic or control traffic may be used. The UE 10 and the eNB 20 are connected by means of a Uu interface. The eNBs 20 are interconnected by means of an X2 interface. Neighboring eNBs may have a meshed network structure that has the X2 interface. The eNBs 20 are connected to the EPC by means of an S1 interface. The eNBs 20 are connected to the MME by means of an S1-MME interface, and are connected to the S-GW by means of S1-U interface. The S1 interface supports a many-to-many relation between the eNB 20 and the MME/S-GW.

The eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

FIG. 2 shows a control plane of a radio interface protocol of an LTE system. FIG. 3 shows a user plane of a radio interface protocol of an LTE system.

Layers of a radio interface protocol between the UE and the E-UTRAN may be classified into a first layer (L1), a second layer (L2), and a third layer (L3) based on the lower three layers of the open system interconnection (OSI) model that is well-known in the communication system. The radio interface protocol between the UE and the E-UTRAN may be horizontally divided into a physical layer, a data link layer, and a network layer, and may be vertically divided into a control plane (C-plane) which is a protocol stack for control signal transmission and a user plane (U-plane) which is a protocol stack for data information transmission. The layers of the radio interface protocol exist in pairs at the UE and the E-UTRAN, and are in charge of data transmission of the Uu interface.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data is transferred between the MAC layer and the PHY layer through the transport channel. Between different PHY layers, i.e., a PHY layer of a transmitter and a PHY layer of a receiver, data is transferred through the physical channel using radio resources. The physical channel is modulated using an orthogonal frequency division multiplexing (OFDM) scheme, and utilizes time and frequency as a radio resource.

The PHY layer uses several physical control channels. A physical downlink control channel (PDCCH) reports to a UE about resource allocation of a paging channel (PCH) and a downlink shared channel (DL-SCH), and hybrid automatic repeat request (HARQ) information related to the DL-SCH. The PDCCH may carry a UL grant for reporting to the UE about resource allocation of UL transmission. A physical control format indicator channel (PCFICH) reports the number of OFDM symbols used for PDCCHs to the UE, and is transmitted in every subframe. A physical hybrid ARQ indicator channel (PHICH) carries an HARQ acknowledgement (ACK)/non-acknowledgement (NACK) signal in response to UL transmission. A physical uplink control channel (PUCCH) carries UL control information such as HARQ ACK/NACK for DL transmission, scheduling request, and CQI. A physical uplink shared channel (PUSCH) carries a UL-uplink shared channel (SCH).

FIG. 4 shows an example of a physical channel structure.

A physical channel consists of a plurality of subframes in time domain and a plurality of subcarriers in frequency domain. One subframe consists of a plurality of symbols in the time domain. One subframe consists of a plurality of resource blocks (RBs). One RB consists of a plurality of symbols and a plurality of subcarriers. In addition, each subframe may use specific subcarriers of specific symbols of a corresponding subframe for a PDCCH. For example, a first symbol of the subframe may be used for the PDCCH. The PDCCH carries dynamic allocated resources, such as a physical resource block (PRB) and modulation and coding scheme (MCS). A transmission time interval (TTI) which is a unit time for data transmission may be equal to a length of one subframe. The length of one subframe may be 1 ms.

The transport channel is classified into a common transport channel and a dedicated transport channel according to whether the channel is shared or not. A DL transport channel for transmitting data from the network to the UE includes a broadcast channel (BCH) for transmitting system information, a paging channel (PCH) for transmitting a paging message, a DL-SCH for transmitting user traffic or control signals, etc. The DL-SCH supports HARQ, dynamic link adaptation by varying the modulation, coding and transmit power, and both dynamic and semi-static resource allocation. The DL-SCH also may enable broadcast in the entire cell and the use of beamforming. The system information carries one or more system information blocks. All system information blocks may be transmitted with the same periodicity. Traffic or control signals of a multimedia broadcast/multicast service (MBMS) may be transmitted through the DL-SCH or a multicast channel (MCH).

A UL transport channel for transmitting data from the UE to the network includes a random access channel (RACH) for transmitting an initial control message, a UL-SCH for transmitting user traffic or control signals, etc. The UL-SCH supports HARQ and dynamic link adaptation by varying the transmit power and potentially modulation and coding. The UL-SCH also may enable the use of beamforming. The RACH is normally used for initial access to a cell.

A MAC layer belongs to the L2. The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. A MAC sublayer provides data transfer services on logical channels.

The logical channels are classified into control channels for transferring control plane information and traffic channels for transferring user plane information, according to a type of transmitted information. That is, a set of logical channel types is defined for different data transfer services offered by the MAC layer. The logical channels are located above the transport channel, and are mapped to the transport channels.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting MBMS control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RLC layer belongs to the L2. The RLC layer provides a function of adjusting a size of data, so as to be suitable for a lower layer to transmit the data, by concatenating and segmenting the data received from a higher layer in a radio section. In addition, to ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides a retransmission function through an automatic repeat request (ARQ) for reliable data transmission. Meanwhile, a function of the RLC layer may be implemented with a functional block inside the MAC layer. In this case, the RLC layer may not exist.

A packet data convergence protocol (PDCP) layer belongs to the L2. The PDCP layer provides a function of header compression function that reduces unnecessary control information such that data being transmitted by employing IP packets, such as IPv4 or IPv6, can be efficiently transmitted over a radio interface that has a relatively small bandwidth. The header compression increases transmission efficiency in the radio section by transmitting only necessary information in a header of the data. In addition, the PDCP layer provides a function of security. The function of security includes ciphering which prevents inspection of third parties, and integrity protection which prevents data manipulation of third parties.

A radio resource control (RRC) layer belongs to the L3. The RLC layer is located at the lowest portion of the L3, and is only defined in the control plane. The RRC layer takes a role of controlling a radio resource between the UE and the network. For this, the UE and the network exchange an RRC message through the RRC layer. The RRC layer controls logical channels, transport channels, and physical channels in relation to the configuration, reconfiguration, and release of RBs. An RB is a logical path provided by the L1 and L2 for data delivery between the UE and the network. That is, the RB signifies a service provided the L2 for data transmission between the UE and E-UTRAN. The configuration of the RB implies a process for specifying a radio protocol layer and channel properties to provide a particular service and for determining respective detailed parameters and operations. The RB is classified into two types, i.e., a signaling RB (SRB) and a data RB (DRB). The SRB is used as a path for transmitting an RRC message in the control plane. The DRB is used as a path for transmitting user data in the user plane.

Referring to FIG. 2, the RLC and MAC layers (terminated in the eNB on the network side) may perform functions such as scheduling, automatic repeat request (ARQ), and hybrid automatic repeat request (HARQ). The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

Referring to FIG. 3, the RLC and MAC layers (terminated in the eNB on the network side) may perform the same functions for the control plane. The PDCP layer (terminated in the eNB on the network side) may perform the user plane functions such as header compression, integrity protection, and ciphering.

An RRC state indicates whether an RRC layer of the UE is logically connected to an RRC layer of the E-UTRAN. The RRC state may be divided into two different states such as an RRC_connected state and an RRC idle state. When an RRC connection is established between the RRC layer of the UE and the RRC layer of the E-UTRAN, the UE is in RRC_CONNECTED, and otherwise the UE is in RRC_IDLE. Since the UE in RRC_CONNECTED has the RRC connection established with the E-UTRAN, the E-UTRAN may recognize the existence of the UE in RRC__CONNECTED and may effectively control the UE. Meanwhile, the UE in RRC_IDLE may not be recognized by the E-UTRAN, and a CN manages the UE in unit of a TA which is a larger area than a cell. That is, only the existence of the UE in RRC_IDLE is recognized in unit of a large area, and the UE must transition to RRC_CONNECTED to receive a typical mobile communication service such as voice or data communication.

In RRC_IDLE state, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell re-selection. Also, in RRC_IDLE state, no RRC context is stored in the eNB.

In RRC_CONNECTED state, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED state, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE state, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion.

A paging message is transmitted over all cells belonging to the same tracking area. If the UE moves from one TA to another TA, the UE will send a tracking area update (TAU) message to the network to update its location.

When the user initially powers on the UE, the UE first searches for a proper cell and then remains in RRC_IDLE in the cell. When there is a need to establish an RRC connection, the UE which remains in RRC_IDLE establishes the RRC connection with the RRC of the E-UTRAN through an RRC connection procedure and then may transition to RRC_CONNECTED. The UE which remains in RRC_IDLE may need to establish the RRC connection with the E-UTRAN when uplink data transmission is necessary due to a user's call attempt or the like or when there is a need to transmit a response message upon receiving a paging message from the E-UTRAN.

It is known that different cause values may be mapped o the signature sequence used to transmit messages between a UE and eNB and that either channel quality indicator (CQI)

or path loss and cause or message size are candidates for inclusion in the initial preamble.

When a UE wishes to access the network and determines a message to be transmitted, the message may be linked to a purpose and a cause value may be determined. The size of the ideal message may be also be determined by identifying all optional information and different alternative sizes, such as by removing optional information, or an alternative scheduling request message may be used.

The UE acquires necessary information for the transmission of the preamble, UL interference, pilot transmit power and required signal-to-noise ratio (SNR) for the preamble detection at the receiver or combinations thereof. This information must allow the calculation of the initial transmit power of the preamble. It is beneficial to transmit the UL message in the vicinity of the preamble from a frequency point of view in order to ensure that the same channel is used for the transmission of the message.

The UE should take into account the UL interference and the UL path loss in order to ensure that the network receives the preamble with a minimum SNR. The UL interference can be determined only in the eNB, and therefore, must be broadcast by the eNB and received by the UE prior to the transmission of the preamble. The UL path loss can be considered to be similar to the DL path loss and can be estimated by the UE from the received RX signal strength when the transmit power of some pilot sequence of the cell is known to the UE.

The required UL SNR for the detection of the preamble would typically depend on the eNB configuration, such as a number of Rx antennas and receiver performance. There may be advantages to transmit the rather static transmit power of the pilot and the necessary UL SNR separately from the varying UL interference and possibly the power offset required between the preamble and the message.

The initial transmission power of the preamble can be roughly calculated according to the following formula:

Transmit power=TransmitPilot−RxPilot+ULInterference+Offset+SNRRequired

Therefore, any combination of SNRRequired, ULInterference, TransmitPilot and Offset can be broadcast. In principle, only one value must be broadcast. This is essentially in current UMTS systems, although the UL interference in 3GPP LTE will mainly be neighboring cell interference that is probably more constant than in UMTS system.

The UE determines the initial UL transit power for the transmission of the preamble as explained above. The receiver in the eNB is able to estimate the absolute received power as well as the relative received power compared to the interference in the cell. The eNB will consider a preamble detected if the received signal power compared to the interference is above an eNB known threshold.

The UE performs power ramping in order to ensure that a UE can be detected even if the initially estimated transmission power of the preamble is not adequate. Another preamble will most likely be transmitted if no ACK or NACK is received by the UE before the next random access attempt. The transmit power of the preamble can be increased, and/or the preamble can be transmitted on a different UL frequency in order to increase the probability of detection. Therefore, the actual transmit power of the preamble that will be detected does not necessarily correspond to the initial transmit power of the preamble as initially calculated by the UE.

The UE must determine the possible UL transport format. The transport format, which may include MCS and a number of resource blocks that should be used by the UE, depends mainly on two parameters, specifically the SNR at the eNB and the required size of the message to be transmitted.

In practice, a maximum UE message size, or payload, and a required minimum SNR correspond to each transport format. In UMTS, the UE determines before the transmission of the preamble whether a transport format can be chosen for the transmission according to the estimated initial preamble transmit power, the required offset between preamble and the transport block, the maximum allowed or available UE transmit power, a fixed offset and additional margin. The preamble in UMTS need not contain any information regarding the transport format selected by the EU since the network does not need to reserve time and frequency resources and, therefore, the transport format is indicated together with the transmitted message.

The eNB must be aware of the size of the message that the UE intends to transmit and the SNR achievable by the UE in order to select the correct transport format upon reception of the preamble and then reserve the necessary time and frequency resources. Therefore, the eNB cannot estimate the SNR achievable by the EU according to the received preamble because the UE transmit power compared to the maximum allowed or possible UE transmit power is not known to the eNB, given that the UE will most likely consider the measured path loss in the DL or some equivalent measure for the determination of the initial preamble transmission power.

The eNB could calculate a difference between the path loss estimated in the DL compared and the path loss of the UL. However, this calculation is not possible if power ramping is used and the UE transmit power for the preamble does not correspond to the initially calculated UE transmit power. Furthermore, the precision of the actual UE transmit power and the transmit power at which the UE is intended to transmit is very low. Therefore, it has been proposed to code the path loss or CQI estimation of the downlink and the message size or the cause value In the UL in the signature.

A home eNB (HeNB) is described. It may be referred to Section 4.6 of 3GPP TS 36.300 V10.9.0 (2012-12).

The E-UTRAN architecture may deploy a HeNB gateway (HeNB GW) to allow the S1 interface between the HeNB and the EPC to support a large number of HeNBs in a scalable manner. The HeNB GW serves as a concentrator for the C-Plane, specifically the S1-MME interface. The S1-U interface from the HeNB may be terminated at the HeNB GW, or a direct logical U-plane connection between the HeNB and the S-GW may be used.

The S1 interface is defined as the interface:
Between the HeNB GW and the core network,
Between the HeNB and the HeNB GW,
Between the HeNB and the core network,
Between the eNB and the core network.

The HeNB GW appears to the MME as an eNB. The HeNB GW appears to the HeNB as an MME. The S1 interface between the HeNB and the EPC is the same, regardless whether the HeNB is connected to the EPC via the HeNB GW or not.

The HeNB GW shall connect to the EPC in a way that inbound and outbound mobility to cells served by the HeNB GW shall not necessarily require inter MME handovers. One HeNB serves only one cell.

The functions supported by the HeNB shall be the same as those supported by the eNB (with possible exceptions, e.g., NAS node selection function (NNSF)) and the procedures run between the HeNB and the EPC shall be the same as those between the eNB and the EPC (with possible exceptions, e.g., S5 procedures in case of local IP access (LIPA) support).

FIG. 5 shows overall E-UTRAN architecture with deployed HeNB GW.

Referring to FIG. 5, the E-UTRAN includes eNBs 50, HeNBs 60 and HeNB GW 69. One or more E-UTRAN MME/S-GW 59 may be positioned at the end of the network and connected to an external network. The eNBs 50 are connected to each other through the X2 interface. The eNBs 50 are connected to the MME/S-GW 59 through the S1 interface. The HeNB GW 69 is connected to the MME/S-GW 59 through the S1 interface. The HeNBs 60 are connected to the HeNB GW 69 through the S1 interface or are connected to the MME/S-GW 59 through the S1 interface or S5 interface.

Referring to FIG. 5, the HeNBs 60 are connected to each other through the X2 interface. Only the HeNBs with the same closed subscriber group (CSG) identifiers (IDs) may have the direct X2 interface even if some HeNBs may support a hybrid mode. If specific conditions are satisfied, handover may be done through direct X2 interface. That is, X2-based handover between HeNBs may be allowed if no access control at the MME is needed, i.e., when the handover is between closed/hybrid access HeNBs having the same CSG IDs or when the target HeNB is an open access HeNB.

In LTE-A rel-11, the X2 interface between the macro eNB and the HeNB have been introduced. A direct X2 interface or an indirect X2 interface between the macro eNB and the HeNB may be set up. For the indirect X2 interface, an X2-GW may be newly deployed. How to perform the X2 setup procedure for the X2-GW may be a problem.

SUMMARY OF THE INVENTION

The present invention provides a method and apparatus for performing an X2 setup procedure in a wireless communication system. The present invention provides a method for performing an initial X2 setup between a home eNodeB (HeNB) and an X2 gateway (GW). The present invention provides a solution of initial X2 setup problem for HeNB mobility enhancement, which is caused by existence of the X2-GW.

In an aspect, a method for performing, by an X2 gateway (GW), an X2 setup procedure in a wireless communication system is provided. The method includes establishing a stream control transmission protocol (SCTP) connection with an eNodeB (eNB) based on a transport network layer (TNL) address of the X2-GW, receiving an X2 setup request message from the eNB, and transmitting an indication which indicates an invalidity of served cell information IE to the eNB.

The method may further include transmitting an X2 setup response message to the eNB as a response to the X2 setup request message.

The indication may be transmitted by being included in the X2 setup response message.

The indication may be a new IE in the X2 setup response message.

The indication may be a fake served cell information IE in the X2 setup response message.

The fake served cell information IE may use a random number or a fixed number.

The indication may be transmitted as a message.

The indication may further indicate an invalidity of other related IEs.

The eNB may be either a macro eNB or a home eNB (HeNB).

In another aspect, a method for performing, by an eNodeB (eNB), an X2 setup procedure in a wireless communication system is provided. The method includes configuring a transport network layer (TNL) address of an X2-GW, establishing a stream control transmission protocol (SCTP) connection with the X2-GW based on the configured TNL address of the X2-GW, transmitting an X2 setup request message to the X2-GW, and receiving an indication which indicates an invalidity of served cell information IE from the X2-GW.

Initial X2 setup problem caused by existence of the X2-GW can be solved.

BRIEF DESCRIPTION OF THE DRAWINGS

FIG. 3 shows a user plane of a radio interface protocol of an LTE system.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. IEEE 802.16m is an evolution of IEEE 802.16e, and provides backward compatibility with an IEEE 802.16-based system. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in downlink and uses the SC-FDMA in uplink. LTE-advance (LTE-A) is an evolution of the 3GPP LTE.

For clarity, the following description will focus on the LTE-A. However, technical features of the present invention are not limited thereto.

In LTE-A rel-11, an X2 interface between a macro eNodeB (eNB) and a home eNB (HeNB) have been introduced. A direct X2 interface or an indirect X2 interface between the macro eNB and the HeNB may be set up.

Figure 1:
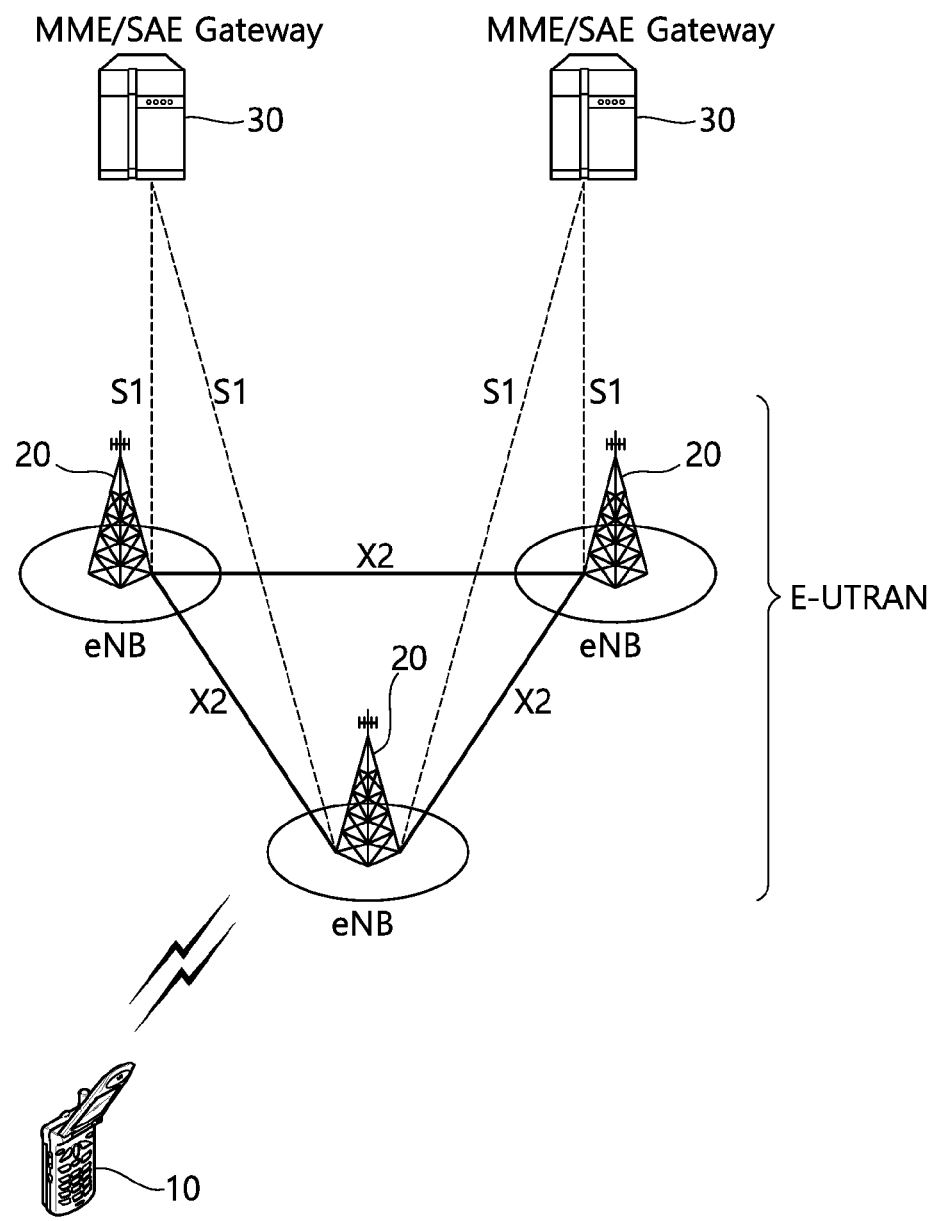
FIG. 1 shows LTE system architecture.
Figure 2:
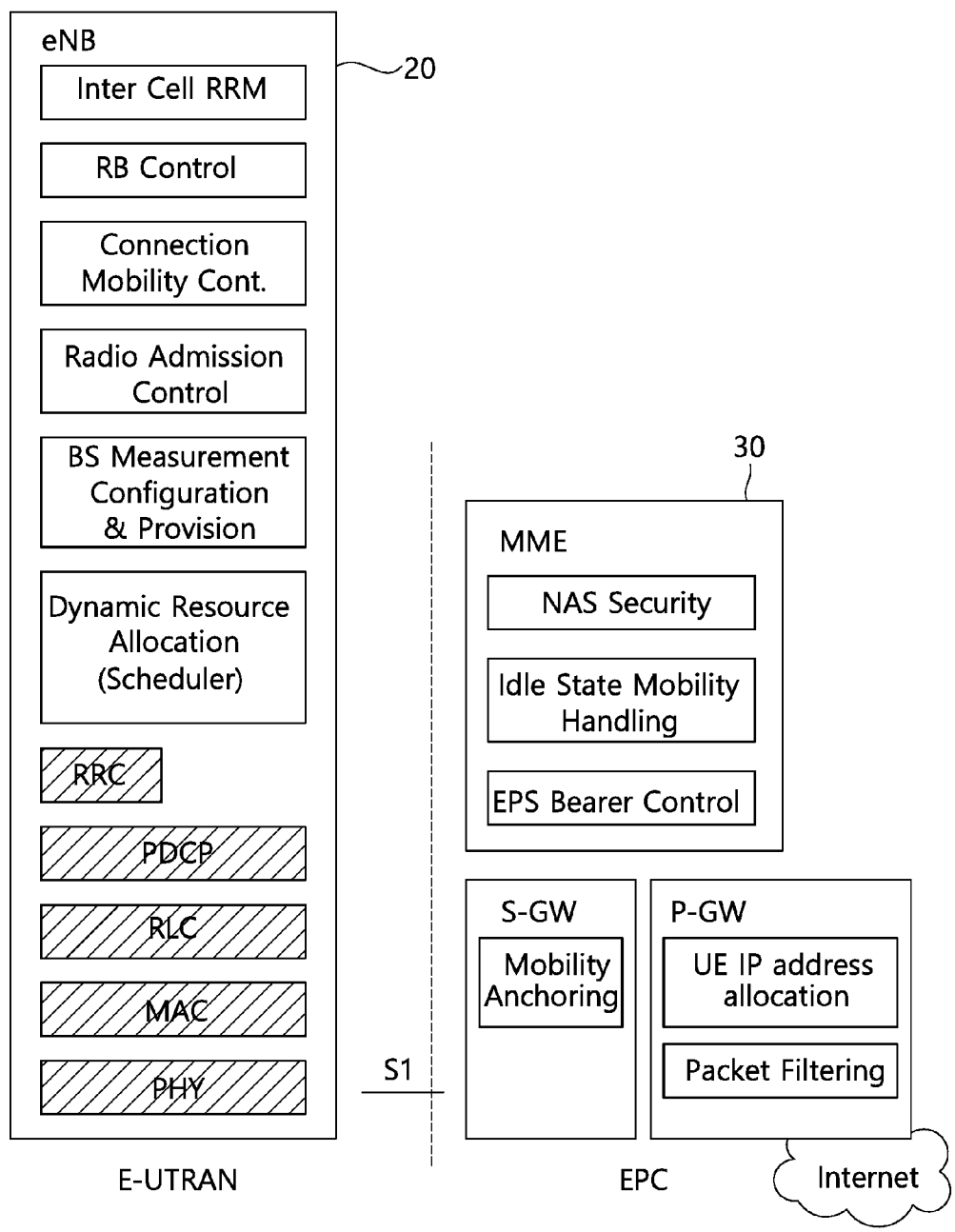
FIG. 2 shows a control plane of a radio interface protocol of an LTE system.
Figure 4:
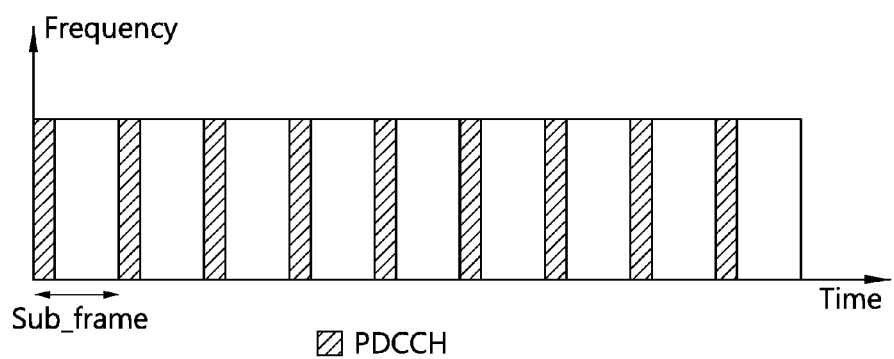
FIG. 4 shows an example of a physical channel structure.
Figure 5:
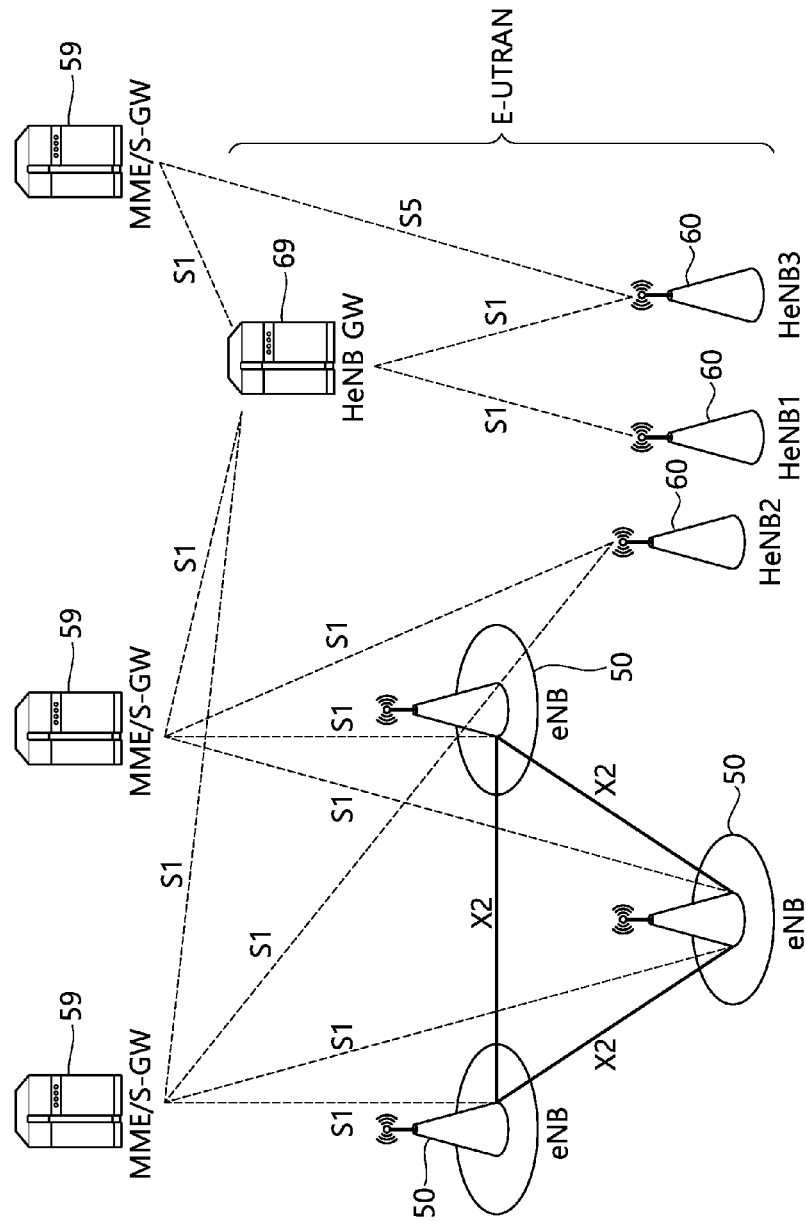
FIG. 5 shows overall E-UTRAN architecture with deployed HeNB GW.
Figure 6:
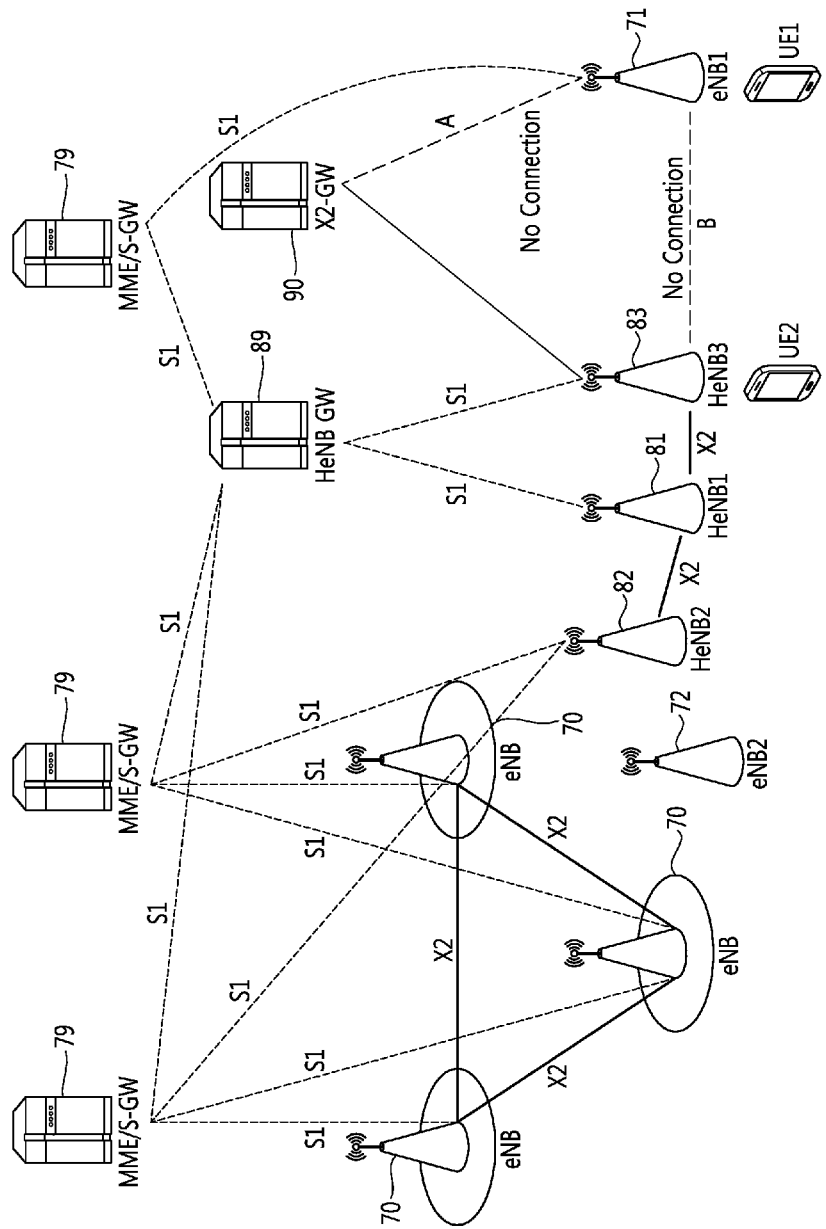
FIG. 6 shows an example of an X2 setup procedure between a macro eNB and HeNB.

FIG. 6 shows an example of an X2 setup procedure between a macro eNB and HeNB.

Referring to FIG. 6, the E-UTRAN includes macro eNBs 70, 71, 72, HeNBs 80, 81, 82, 83, HeNB GW 89, and X2-GW 90. One or more E-UTRAN MME/S-GW 79 may be positioned at the end of the network and connected to an external network. The macro eNBs 70 are connected to each other through the X2 interface. The macro eNBs 70, 71 are connected to the MME/S-GW 79 through the S1 interface. The HeNB GW 89 is connected to the MME/S-GW 79 through the S1 interface. The HeNB 81, 83 are connected to the HeNB GW 89 through the S1 interface. The HeNB 82 is connected to the MME/S-GW 79 through the S1 interface. The HeNBs 81, 82, 83 are connected to each other through the X2 interface.

The X2-GW 90 may be additionally deployed. The X2-GW 90 may be connected to the HeNB3 83 through the X2 interface. However, connection between the macro eNB1 71 and X2-GW 90 or connection between the macro eNB1 71 and HeNB3 83 is not established, yet.

The X2 interface may be introduced between the macro eNB and HeNB. There may exist two possible connections, one of which is to connect the HeNB and macro eNB indirectly by going through the X2-GW (path "A" in FIG. 6). The other way is to connect the HeNB and macro eNB directly by the X2 interface (path "B" in FIG. 6). Based on the structure described above in FIG. 6, X2 handover may be performed more quickly between the HeNB and macro eNB.

For path "A" in FIG. 6, the X2-GW and HeNB GW may be separate nodes. Since the X2 interface is not yet set between the macro eNB1 71 and the HeNB3 83, which means that whether the direct X2 interface or the indirect X2 interface going through the X2-GW has not been set up.

X2 setup procedure is described. It may be referred to Section 8.3.3, 9.1.2.3 and 9.1.2.4 of 3GPP 36.423 V11.2.0 (2012-09). The purpose of the X2 setup procedure is to exchange application level data needed for two eNBs to interoperate correctly over the X2 interface. This procedure erases any existing application level configuration data in the two nodes and replaces it by the one received. This procedure also resets the X2 interface like a reset procedure would do. The procedure uses non UE-associated signaling.

Figure 7:
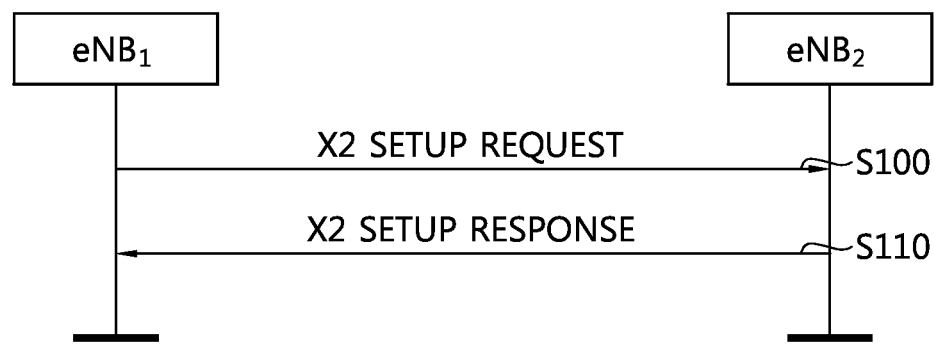
FIG. 7 shows a successful operation of an X2 setup procedure.

FIG. 7 shows a successful operation of an X2 setup procedure.

In step S100, an eNB1 initiates the X2 setup procedure by sending the X2 SETUP REQUEST message to a candidate eNB2. In step S110, the candidate eNB2 replies with the X2 SETUP RESPONSE message. The initiating eNB1 shall transfer the complete list of its served cells and, if available, a list of supported GU Group Ids to the candidate eNB2. The candidate eNB2 shall reply with the complete list of its served cells and shall include, if available, a list of supported GU Group Ids in the reply.

If a cell is switched off for energy savings reasons, it should be activated before initiating or responding to the X2 setup procedure and shall still be included in the list of served cells.

Table 1 shows an example of an X2 setup request message. This message is sent by an eNB to a neighboring eNB to transfer the initialization information for a transport network layer (TNL) association.

TABLE 1

| IE/Group Name | Presence | Range | IE type and reference | Semantics description | Criticality | Assigned Criticality |
|---|---|---|---|---|---|---|
| Message Type | M | | 9.2.13 | | YES | reject |
| Global eNB ID | M | | 9.2.22 | | YES | reject |
| Served Cells | | 1 ... <maxCellineNB> | | Complete list of cells served by the eNB | YES | reject |
| >Served Cell Information | M | | 9.2.8 | | — | — |
| >Neighbour Information | | 0 ... <maxnoofNeighbours> | | | — | — |
| >>ECGI | M | | ECGI 9.2.14 | E-UTRAN Cell Global Identifier of the neighbour cell | — | — |
| >>PCI | M | | INTEGER (0 ... 503, ...) | Physical Cell Identifier of the neighbour cell | — | — |
| >>EARFCN | M | | 9.2.26 | DL EARFCN for FDD and EARFCN for TDD | — | — |
| >>TAC | O | | OCTET STRING (2) | Tracking Area Code | YES | ignore |
| GU Group Id List | | 0 ... <maxfPools> | | This is all the pools to which the eNB belongs to | GLOBAL | reject |
| >GU Group Id | M | | 9.2.20 | | — | — |

Table 2 shows an example of an X2 setup response message. This message is sent by an eNB to a neighboring eNB to transfer the initialization information for a TNL association.

contain the CSG ID IE. The eNB receiving the IE shall take this information into account when further deciding whether X2 handover between the source cell and the target cell may be performed.

TABLE 2

| IE/Group Name | Presence | Range | IE type and reference | Semantics description | Criticality | Assigned Criticality |
|---|---|---|---|---|---|---|
| Message Type | M | | 9.2.13 | | YES | reject |
| Global eNB ID | M | | 9.2.22 | | YES | reject |
| Served Cells | | 1 . . . <maxCellineNB> | | Complete list of cells served by the eNB | YES | reject |
| >Served Cell Information | M | | 9.2.8 | | — | — |
| >Neighbour Information | | 0 . . . <maxnoofNeighbours> | | | — | — |
| >>ECGI | M | | ECGI 9.2.14 | E-UTRAN Cell Global Identifier of the neighbour cell | — | — |
| >>PCI | M | | INTEGER (0 . . . 503, . . .) | Physical Cell Identifier of the neighbour cell | — | — |
| >>EARFCN | M | | 9.2.26 | DL EARFCN for FDD and EARFCN for TDD | — | — |
| >>TAC | O | | OCTET STRING (2) | Tracking Area Code | YES | ignore |
| GU Group Id List | | 0 . . . <maxPools> | | This is all the pools to which the eNB belongs to | GLOBAL | reject |
| >GU Group Id | M | | 9.2.20 | | — | — |
| Criticality Diagnostics | O | | 9.2.7 | | YES | ignore |

The initiating eNB1 may include the Neighbour Information IE in the X2 SETUP REQUEST message. The candidate eNB2 may also include the Neighbour Information IE in the X2 SETUP RESPONSE message. The Neighbour Information IE shall only include E-UTRAN cells that are direct neighbors of cells in the reporting eNB2. A direct neighbor of one cell of eNB2 may be any cell belonging to an eNB that is a neighbor of that eNB2 cell, e.g., even if the cell has not been reported by a UE. The initiating eNB1 may include the TAC IE with the Neighbour Information IE in the X2 SETUP REQUEST message. The candidate eNB2 may also include the TAC IE with the Neighbour Information IE in the X2 SETUP RESPONSE message.

The initiating eNB1 may include the Number of Antenna Ports IE in the X2 SETUP REQUEST message. The candidate eNB2 may also include the Number of Antenna Ports IE in the X2 SETUP RESPONSE message.

The initiating eNB1 may include the PRACH Configuration IE in the X2 SETUP REQUEST message. The candidate eNB2 may also include the PRACH Configuration IE in the X2 SETUP RESPONSE message. The eNB receiving the IE may use this information for RACH optimization.

The initiating eNB1 may include the MBSFN Subframe Info IE in the X2 SETUP REQUEST message. The candidate eNB2 may also include the MBSFN Subframe Info IE in the X2 SETUP RESPONSE message.

For each CSG cell or hybrid cell served by the initiating eNB1, the X2 SETUP REQUEST message shall contain the CSG ID IE. For each CSG cell or hybrid cell served by the candidate eNB2, the X2 SETUP RESPONSE message shall The initiating eNB1 may include the MBMS Service Area Identity List IE in the X2 SETUP REQUEST message. The candidate eNB2 may also include the MBMS Service Area Identity List IE in the X2 SETUP RESPONSE message.

For each cell served by the initiating eNB1, the X2 SETUP REQUEST message may contain the MultibandInfoList IE. For cell served by the candidate eNB2, the X2 SETUP RESPONSE message may contain the MultibandInfoList IE. The eNB receiving the IE shall, if supported, take this information into account when further deciding whether subsequent mobility actions between the source cell and the target cell may be performed.

Meanwhile, with the IP address, how to setup the stream control transmission protocol (SCTP) connection and X2 interface is still a problem to solve. A TNL address of the X2-GW may be pre-configured to the HeNB (or macro eNB). The HeNB may initiate the SCTP connection with the X2-GW if it receives the TNL address of the X2-GW. After that, the HeNB initiates the X2 setup procedure with the X2-GW. However, by using the existing X2 setup/response messages, it does not work because at the initial stage there is not any cell served by the X2-GW.

Figure 8:
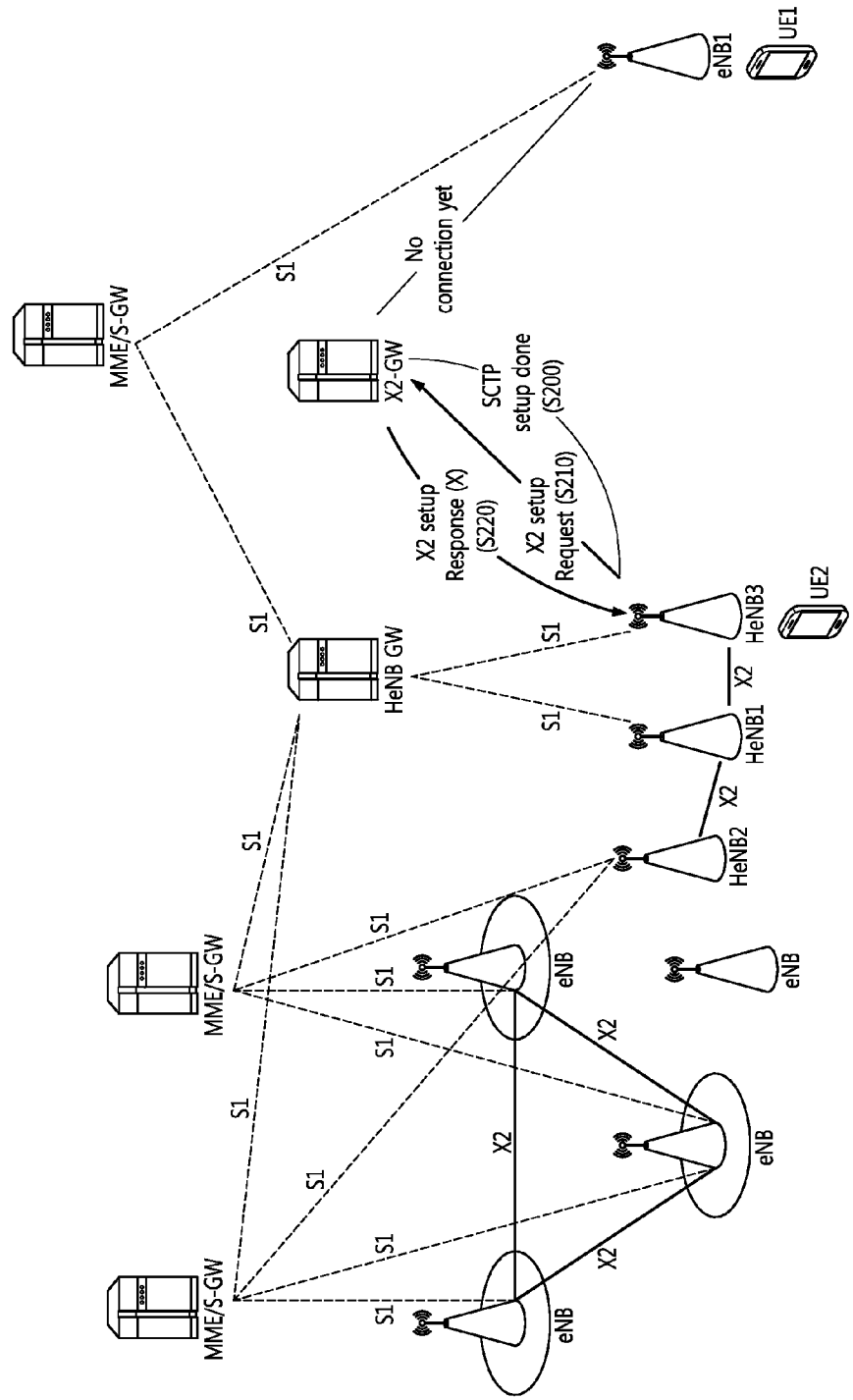
FIG. 8 shows a problem of an X2 setup procedure at an initial stage of an X2-GW per-configuration.

FIG. 8 shows a problem of an X2 setup procedure at an initial stage of an X2-GW per-configuration.

In step S200, it is assumed that the HeNB3 does know the TNL address of the X2-GW by the X2-GW pre-configuration. The HeNB3 initiates the SCTP connection with the X2-GW, and the SCTP setup between the HeNB3 and the X2-GW is done.

In step S210, the HeNB3 initiates the X2 setup procedure with the X2-GW by transmitting the X2 setup request message to the X2-GW.

In step S220, the X2-GW tries to transmit the X2 setup response message to the HeNB3 as a response to the X2 setup request message. At an initial stage, there is no cell served by the X2-GW. However, according to the current X2 setup response message described in Table 2 above, the X2 setup response message has to include served cell information served by the X2-setup, which is mandatory. Accordingly, it may be a problem how does the X2-GW transmit the X2 setup response message when there is no cell served by the X2-GW at the initial stage of the X2 setup procedure.

Hereinafter, a method for performing the X2 setup procedure for the X2-GW according to an embodiment of the present invention is described. In the description below, it is assumed that the X2 setup procedure between the HeNB and the X2-GW is initiated by the HeNB. However, the present invention is not limited thereto, and the present invention may be applied to the case that the X2 setup procedure between the macro eNB and the X2-GW is initiated by the macro eNB.

Figure 9:
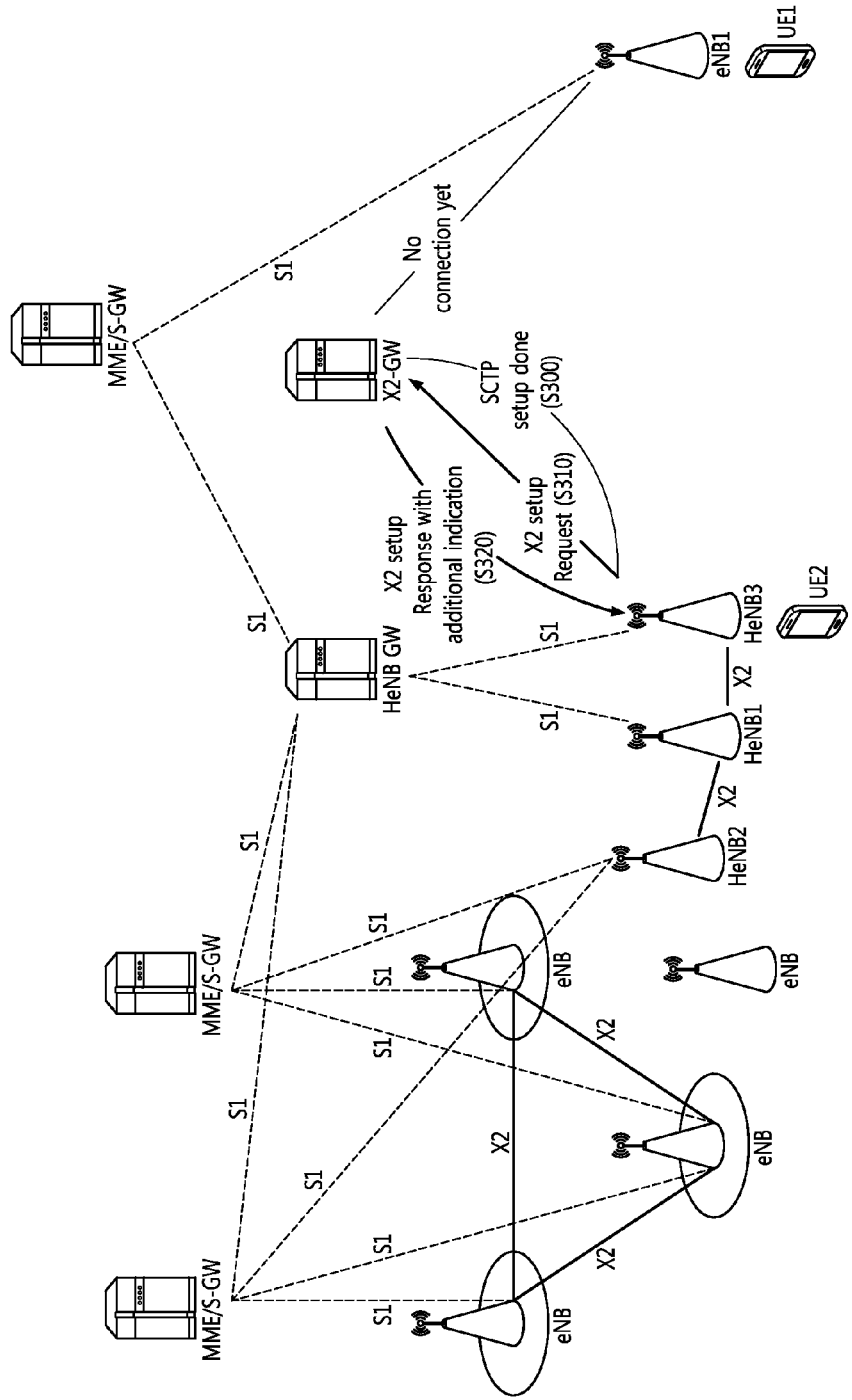
FIG. 9 shows an example of an X2 setup procedure at an initial stage of an X2-GW per-configuration according to an embodiment of the present invention.

FIG. 9 shows an example of an X2 setup procedure at an initial stage of an X2-GW per-configuration according to an embodiment of the present invention.

In step S300, the TNL address of the X2-GW is pre-configured to the HeNB (or the macro eNB). The SCTP connection is established between the HeNB (or the macro eNB) and the X2-GW based on the pre-configured TNL address of the X2-GW.

In step S310, the HeNB transmits the X2 setup request message to the X2-GW.

In step S320, the X2-GW transmits the X2 setup response message to the HeNB (or the macro eNB) with an additional indication. The additional indication may indicate the invalidity of served cell information IE and other related IEs, if existing, in the X2 setup response message. Upon receiving the X2 setup response with the additional indication, the HeNB (or the macro eNB) treats the served cell information IE (and or other related IEs if existing) in the X2 setup response message invalid.

The additional indication may be additionally included in the X2 setup response message as a form of IE. Table 3 shows an example of an X2 setup response message according to an embodiment of the present invention. This message is sent by an eNB to a neighboring eNB to transfer the initialization information for a TNL association.

TABLE 3

| IE/Group Name | Presence | Range | IE type and reference | Semantics description | Criticality | Assigned Criticality |
|---|---|---|---|---|---|---|
| Message Type | M | | 9.2.13 | | YES | reject |
| Global eNB ID | M | | 9.2.22 | | YES | reject |
| Served Cells | | 1 ... <maxCellineNB> | | Complete list of cells served by the eNB | YES | reject |
| >Served Cell Information | M | | 9.2.8 | | — | — |
| >Neighbour Information | | 0 ... <maxnoofNeighbours> | | | — | — |
| >>ECGI | M | | ECGI 9.2.14 | E-UTRAN Cell Global Identifier of the neighbour cell | — | — |
| >>PCI | M | | INTEGER (0 ... 503, ...) | Physical Cell Identifier of the neighbour cell | — | — |
| >>EARFCN | M | | 9.2.26 | DL EARFCN for FDD and EARFCN for TDD | — | — |
| >>TAC | O | | OCTET STRING (2) | Tracking Area Code | YES | ignore |
| GU Group Id List | | 0 ... <maxPools> | | This is all the pools to which the eNB belongs to | GLOBAL | reject |
| >GU Group Id | M | | 9.2.20 | | — | — |
| Criticality Diagnostics | O | | 9.2.7 | | YES | ignore |
| Invalidity of Serving Cell Information | O | | x.x.x | | YES | ignore |

Referring to Table 3, the additional indication is included in the X2 setup response message as a form of "Invalidity of Serving Cell Information" IE.

Or, the additional indication may be transmitted as a form of a message independent with the X2 setup response message. For example, "an invalidity of serving cell information message" may be transmitted. This message is sent by an eNB to a neighboring eNB to indicate the invalidity of serving cell information and other related IEs if exists.

Alternatively, without the additional indication, the X2-GW transmits the X2 setup response message with a fake served cell information IE. The X2-GW may use a random number or fixed number as the fake served cell information IE depending on the X2-GW. Upon receiving the X2 setup response with the fake served cell information IE, the HeNB (or the macro eNB) may smartly store the information and wait for further updating.

Figure 10:
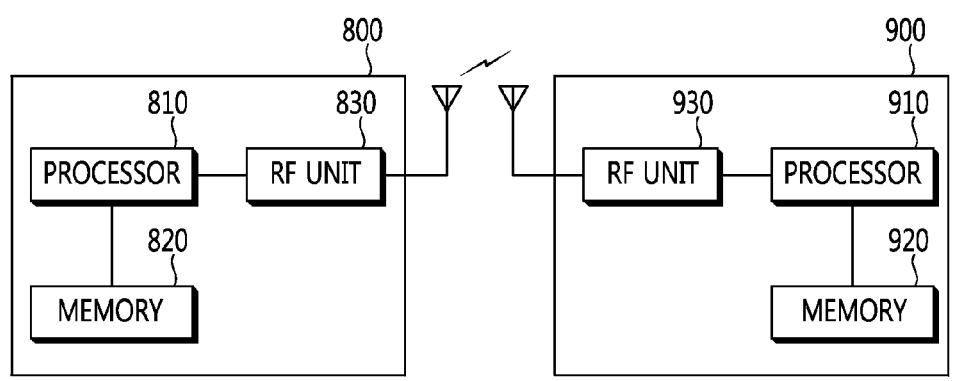
FIG. 10 shows a wireless communication system to implement an embodiment of the present invention.

FIG. 10 shows a wireless communication system to implement an embodiment of the present invention.

An X2-GW 800 includes a processor 810, a memory 820, and a radio frequency (RF) unit 830. The processor 810 may be configured to implement proposed functions, procedures, and/or methods in this description. Layers of the radio interface protocol may be implemented in the processor 810. The memory 820 is operatively coupled with the processor 810 and stores a variety of information to operate the processor 810. The RF unit 830 is operatively coupled with the processor 810, and transmits and/or receives a radio signal.

An eNB 900 may include a processor 910, a memory 920 and a RF unit 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The RF unit 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method for performing, by an X2 gateway (GW), an X2 setup procedure in a wireless communication system, the method comprising:
    establishing a stream control transmission protocol (SCTP) connection with an eNodeB (eNB) based on a transport network layer (TNL) address of the X2-GW;
    receiving an X2 setup request message from the eNB; and
    transmitting an X2 setup response message including a fake served cell information IE, which indicates an invalidity of served cell information IE, to the eNB as a response to the X2 setup request message.

2. The method of claim 1, wherein the fake served cell information IE uses a random number or a fixed number.

3. The method of claim 1, wherein the indication further indicates an invalidity of other related IEs.

4. The method of claim 1, wherein the eNB is either a macro eNB or a home eNB (HeNB).

5. A method for performing, by an eNodeB (eNB), an X2 setup procedure in a wireless communication system, the method comprising:
    configuring a transport network layer (TNL) address of an X2-GW;
    establishing a stream control transmission protocol (SCTP) connection with the X2-GW based on the configured TNL address of the X2-GW;
    transmitting an X2 setup request message to the X2-GW; and
    receiving an X2 setup response message including a fake served cell information IE, which indicates an invalidity of served cell information IE, from the X2-GW as a response to the X2 setup request message.

* * * * *